Patented Oct. 6, 1942

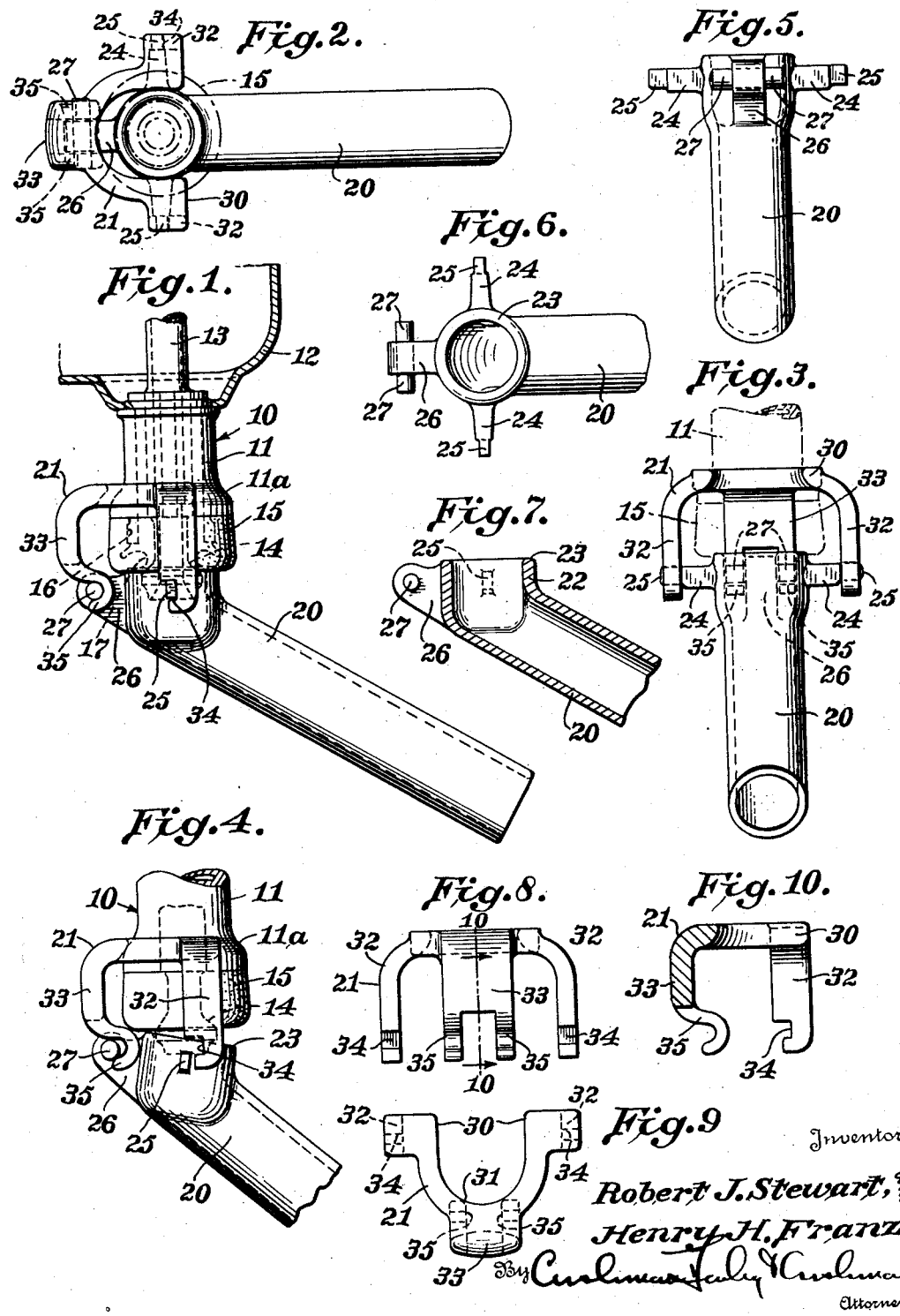

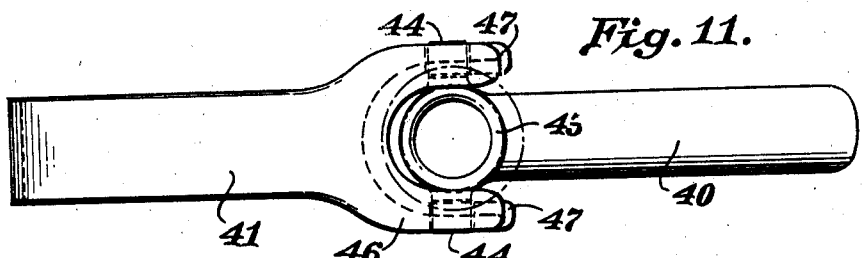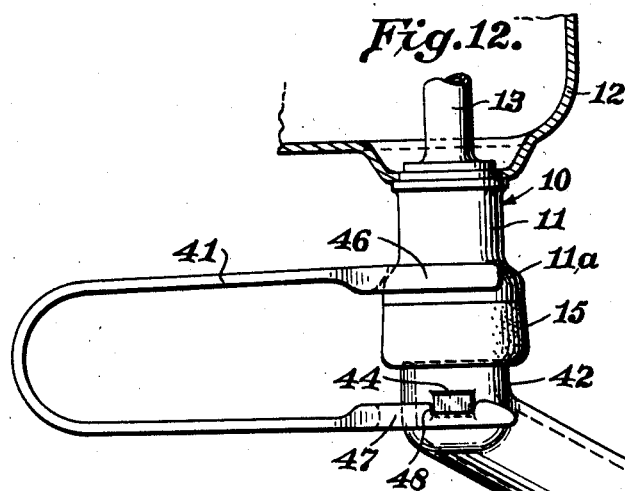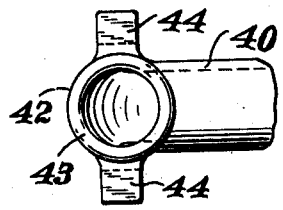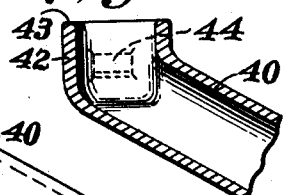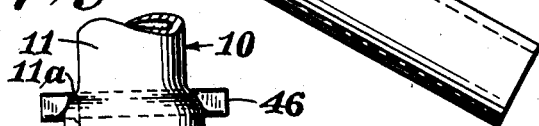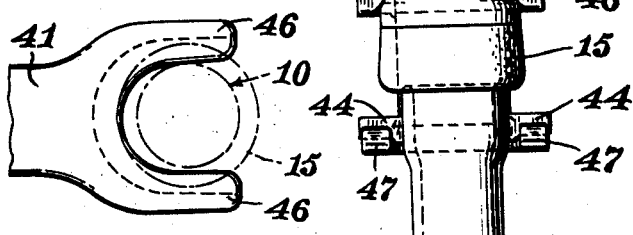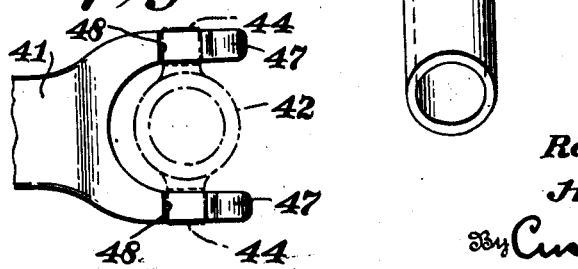

2,297,810

UNITED STATES PATENT OFFICE 2,297,810

DRAIN FITTING

Robert J. Stewart and Henry H. Franz, Baltimore, Md., assignors to Crown Cork & Seal Company, Inc., Baltimore, Md., a corporation of New York Application July 24, 1939, Serial No. 286,258

2 Claims. (Cl. 285—129)

The present invention relates to a drain fitting for valves and, more particularly, to a drain fitting adapted to be used upon the reservoir of a milk filling machine.

All parts of a milk filling machine with which milk contacts must be frequently disassembled for cleaning and before the milk reservoir can be cleaned, all milk must of course be drained from it. It is not desirable to fit the reservoir with a drain valve, because this would simply mean the addition to the machine of a fitting difficult to clean. Heretofore, when a desired run of bottles has been filled and a quantity of milk is still in the filling reservoir, it has been the practice for an operator to hold one of the filling valves in open position until all of the milk in the reservoir has been drained into a receptacle for return to a storage tank.

The principal object of the present invention is to provide a drain fitting which can be readily secured to a valve body or to the reservoir to operate the valve element to open position and retain it in that position without further attention on the part of an operator.

Another object of the invention is to provide a drain fitting which is entirely sanitary.

The fitting of the present invention is of such construction that it can be readily cleaned and, furthermore, is of such design that it can be applied to a filling valve to open the same without possibility of any of the flowing milk coming into contact with the operator's hand, or without possibility of the operator touching any surface over which milk is to flow.

Other objects and advantages of the invention will be apparent from the specification and drawings wherein:

Figure 1 shows the drain fitting of the present invention fitted to the filling valve of a filling machine, the view being in side elevation.

Figure 2 is a top plan view of the drain fitting.

Figure 3 is a front view of the fitting.

Figure 4 is a side view showing the manner of applying the fitting to a filling valve.

Figure 5 is a rear view of the flow tube element of the fitting.

Figures 6 and 7 are top and vertical sectional views of the flow tube element of the fitting.

Figures 8 and 9 are rear and top plan views of the supporting element of the fitting.

Figure 10 is a sectional view of the supporting element on the line 10—10 of Figure 8.

Figure 11 is a top plan view of a modified form of fitting.

Figure 12 is a side elevation showing the fitting of Figure 11 applied to a filling head.

Figure 13 is a front view of the fitting of Figure 11 showing it in position on a filling head.

Figures 14 and 15 are top plan and vertical sectional views of the flow tube element of Figure 11.

Figure 16 is a top plan view of the upper portion of the supporting element of Figure 11, and Figure 17 is a top plan view of the lower portion of the supporting element of Figure 11.

The drain fittings disclosed herein are particularly intended for use with a bottle filling valve of the type shown in our application for Filling structure, Serial No. 215,680, filed June 24, 1938. A filling head of this type is indicated at 10 in Figure 1 and includes a shell 11 depending from and fixed to the lower wall of a reservoir 12. The shell 11 is enlarged at its lower end as indicated at 11a and has a vent tube 13 seated therein. Vent tube 13 is centered in the shell 11 to define an annular flow passage for milk between its outer surface and the inner surface of the shell bore. The tube 13 extends below the shell and is enlarged at its lower end to form a seating surface 14 indicated in dotted lines. A resilient valve member 15 has a tight fit upon the depending portion 16 of the shell 11 and the lower annular edge or lip 17 of valve 15 is normally adapted to seat upon the enlarged end of the vent tube 13 to prevent flow. The valve 15 is actuated to open position by contact of a bottle with the lower portion or lip 17 of the valve ring so as to move this portion upwardly and out of contact with the enlarged seat 14 of vent tube 13. When this occurs milk will flow downwardly between valve lip 17 and seat 14 and air in the container being filled will move upwardly through vent tube 13.

Referring to the drain fitting disclosed in Figures 1 to 10, it comprises a flow or drain tube element 20 and a supporting element 21. The tube element 20 is in the form of an angled pipe including a short upper leg or portion 22 having a lip 23 which is adapted to bear upon the lip portion 17 of a filling valve as illustrated in Figure 1. A stud 24 having its outer end 25 somewhat reduced to be of rectangular shape projects from each side of the upper portion 22 of flow tube element 20 and a lug 26 projects from the rear of upper portion 22, lug 26 having a pin 27 extending horizontally therethrough.

As best shown in Figure 9, the supporting element 21 is, in top plan, of generally U-shaped form including legs 30 and a bight portion 31.

A side leg 32 projects downwardly from the end of each of the arms 30 and a leg 33 projects downwardly from the bight or rear portion 31. It will be noted that each of the three legs extends outwardly and thence downwardly from the upper U-shaped portion. Each side leg 32 is cut away at the lower end of its rear face and a rectangular recess 34 is provided in the upper portion of the reduced portion thus provided. As best shown in Figures 8 and 10, the rear leg 33, at its lower end, is bent inwardly and bifurcated to form a pair of spaced hooks 35.

In use, when it is desired to drain the reservoir 12 through one of the filling valves 10, the supporting element 21 is fitted upon the shell 11 of the filling valve, which is a part of the reservoir, so that its upper U-shaped portion will bear upon the enlarged lower end 11a of the shell as shown in Figure 4. The tube element 20 of the drain fitting is then moved to a position approximating that shown in Figure 4 so that its lug 26 will be positioned between the hooks 35 of element 21 and with the pin 27 horizontally in alignment and partially engaged with the hooks. At the same time, the studs 24 will be slightly below the recesses 34 in the side legs 32 of element 21.

At this time the filling valve will still be closed but when the tube element 20 is swung slightly upwardly and to the right of the position shown in Figure 4, the studs 24 of tube element 20 will seat in the recesses 34 and the pins 27 will move into engagement with the hooks 35, this upward movement of the tube element 20 bringing its lip 23 into contact with the lower lip 17 of the resilient valve 15 to raise the valve lip from contact with the seating surface 14 of vent tube 13 so that milk will flow from the filling valve and through the tube element 20 to a suitable receptacle.

In order to obtain a free flow of milk throughout the annular space defined between the lip 17 of the valve 15 and the seating surface 14 of vent tube 13, the supporting element 21 may then be moved slightly to the left from the position shown in Figure 4 to the position shown in Figure 1, so that the mouth of the bore of flow tube element 20 will be concentric with the rubber valve 15.

It will be observed that by the above device, the filling valve will be held open for free flow of milk or other liquid from the reservoir without further attention on the part of the operator.

Referring to the structure shown in Figures 11 to 17, the drain fitting there illustrated comprises a flow or drain tube element 40 and a supporting element 41 adapted to be used upon a filling valve 10 of the same construction as illustrated in Figure 1. The tube element 40 of Figures 11 to 17 is an angled tube including a short upper leg 42 which includes a lip 43 and has lugs 44 projecting from each side thereof, which lugs are rectangular in cross section. The supporting element 41 is of U-shaped form in side elevation as best shown in Figure 12, and is formed of spring metal. The ends of the element 41 are enlarged and have their central portions cut out to form an upper U-shaped head 46 as best shown in Figure 16, and a lower U-shaped foot 47 best shown in Figure 17. The upper surface of the foot portion 47 is notched on opposite sides as indicated at 48 in Figures 12 to 17 to form a hook portion.

In the use of the device shown in Figures 11 to 17, it is only necessary that the upper and lower arms of the supporting element 41 be spread after its head 46 has been placed upon the shoulder 11a of the filling head shell 11 or adjacent part of the reservoir and to then place the lugs 44 of the tube element 40 in the notches 48 of the foot portion 47. The supporting element 41 may then be permitted to contract to bring the lip 43 of the tube element 40 upwardly into contact with the lip 17 of the filling valve to raise the same from the seat 14 on the vent tube 13. Obviously, if desired, the device of Figures 11 to 17 may be fitted into position by placing the tube element 40 in proper position with respect to the foot portion 47 of supporting element 41 and then, while the latter element is spread, positioning its head portion 46 upon the shoulder 11a of the filling valve and then permitting the upper and lower arms of the supporting element 41 to move toward each other to the position shown in Figure 12. The arms of supporting element 41 will of course have sufficient tension to urge the flow tube element 40 upwardly to hold the lip 17 of filling valve 15 raised.

Both of the structures described above can readily be fitted to a filling valve or adjacent part of the reservoir to hold the valve open without further attention and each of the structures can readily be cleaned.

It will be understood that the fittings of the invention may be used with various types of valves.

The terminology used in the specification is for the purpose of description and not of limitation, the scope of the invention being indicated in the claims.

We claim:

1. In a drain device for a filling tank filling head, a coupling element including a U-shaped portion adapted to engage a fixed portion of the filling tank, such as the exterior of the filling head, and a plurality of depending legs, said legs having pockets in their lower ends all opening in the same direction, and a tube element provided with projections to seat in the pockets on the coupling element legs.

2. In a drain device for a filling tank filling head, a coupling element including a U-shaped portion adapted to engage a fixed portion of the filling tank, such as the exterior of the filling head, a pair of legs depending from the ends of the U-shaped portion and provided with notches on one lateral surface thereof, a third leg depending from the bight of the U-shaped portion, said last-named leg having a notch therein facing in the same direction as the notches of the first-mentioned legs, and a tube element provided with projections to seat in the notches on the coupling element legs.

ROBERT J. STEWART.
HENRY H. FRANZ.